United States Patent
Chavan (10) Patent No.: US 8,479,222 B2
(45) Date of Patent: Jul. 2, 2013

(54) SIMPLIFYING INTERACTION WITH MULTIPLE APPLICATIONS WHEN USING FORMS VIA A COMMON INTERFACE

(75) Inventor: Sameer Chavan, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 1408 days.

(21) Appl. No.: 11/849,310

(22) Filed: Sep. 3, 2007

(65) Prior Publication Data

US 2009/0025017 A1    Jan. 22, 2009

(51) Int. Cl.
*G06F 9/44* (2006.01)
*G06F 15/16* (2006.01)

(52) U.S. Cl.
USPC .......................................... 719/329; 709/203

(58) Field of Classification Search
USPC ....................................................... 719/329
See application file for complete search history.

(56) References Cited

U.S. PATENT DOCUMENTS

| | | | |
|---|---|---|---|
| 2002/0188674 A1* | 12/2002 | Brown et al. | 709/203 |
| 2007/0044041 A1* | 2/2007 | Beynon et al. | 715/862 |
| 2007/0226233 A1* | 9/2007 | Walter et al. | 707/100 |
| 2008/0126396 A1* | 5/2008 | Gagnon | 707/102 |

\* cited by examiner

*Primary Examiner* — Andy Ho
*Assistant Examiner* — Abdou Seye
(74) *Attorney, Agent, or Firm* — Narendra Reddy Thappeta (57) ABSTRACT

Simplifying interaction with multiple applications when using forms via a common interface. In one embodiment, a mapping data indicating the forms used for corresponding combinations of an action and a class of data is maintained. On receiving an action identifier and a class identifier from a user using a common interface, the specific form is determined from the mapping data based on the action and class identifiers. The specific form is then displayed to the user on a display. As a result, a user can quickly/directly access a desired form.

19 Claims, 9 Drawing Sheets

HRMS Home >View Employees >Add Employee
Add New Employee Page 350

| Add 310 | Employee 315 | ▽ 320 | GO 325 |

330

Emp No: 1002 Generate
Name: Ravi. K
Department: Development
Join Date: 2/1/07

Add   Cancel

HRMS ← 370
http://oracleapps.com/hrms/empadd.htm ← 375
360

FIG. 3B

Procurement Home >View PO >Edit PO 20111
Purchase Order Edit Page 350

| Edit 310 | PO 315 | 20111 ▽ 320 | GO |

PO No: 20111
Description: Laptop
Reason: Laptop needed for new joined person
Vendor: Dell India Pvt
Quotation: Rs. 50,000

Update   Cancel

Procurement ← 390
http://oracleapps.com/proc/poedit20111.htm ← 395

FIG. 4A

| Action | Class | Instance | Location | AppName |
|---|---|---|---|---|
| Add | Employee | - | /empadd.htm | HRMS |
| Edit | Employee | 1001 | /empedit1001.htm | HRMS |
| View | Employee | 34421 | /empview34421.htm | HRMS |
| Add | PO | - | /poadd.htm | Procurement |
| Edit | PO | 20111 | /poedit20111.htm | Procurement |
| List | PO | - | /polist.htm | Procurement |
| Search | PO | - | /posearch.htm | Procurement |

410 – Action
415 – Class
420 – Instance
425 – Location
430 – AppName
441, 442, 443, 444, 445, 446, 447

FIG. 4B

| AppName | AppLocation | Server |
|---|---|---|
| HRMS | /hrms | http://acmeapps.com |
| Procurement | /proc | http://acmeapps.com |

460 – AppName
465 – AppLocation
470 – Server
481, 482

Acme Enterprise

HRMS
Procurement
Finance
Payroll
CRM

Procure Home> View PO >Edit PO 20111
Purchase Order Edit Page

PO No: 20111
Description: Laptop
Reason: Laptop needed for new joined person
Vendor: Dell India Pvt
Quotation: Rs. 50,000

[Update] [Cancel]

Acme Enterprise

HRMS
Procurement
Finance
Payroll
CRM

Procure Home> Home PO
Purchase Order Detail List Page

Create new PO

| PO No. | Description | Date | Actions |
|---|---|---|---|
| 34421 | Mobile | 2/2/07 | View / Edit / Delete |
| 33422 | Desktop | 4/3/07 | View / Edit / Delete |
| 20111 | Laptop | 1/1/07 | View / Edit / Delete |

SIMPLIFYING INTERACTION WITH MULTIPLE APPLICATIONS WHEN USING FORMS VIA A COMMON INTERFACE

RELATED APPLICATION

The present application is related to and claims priority from the co-pending India patent Application entitled, "SIMPLIFYING INTERACTION WITH MULTIPLE APPLICATIONS WHEN USING FORMS VIA A COMMON INTERFACE", Serial Number: 1565/CHE/2007, Filed: Jul. 19, 2007, naming the same inventor Sameer Chavan as in the subject patent application, and is incorporated in its entirety herewith.

BACKGROUND

1. Technical Field

The present disclosure relates to software applications and more specifically to simplifying interaction with multiple applications when using forms via a common interface.

2. Related Art

An application generally refers to a software program, which on execution performs specific actions requested by users. In a common scenario, the application is executed on one or more server systems connected to a network, and requests containing the actions to be performed are received from a client system in response to user provided inputs. A server system may then perform the action contained in the request and send any required responses back to the client system.

An application often enables such actions to be performed by providing corresponding forms. For example, a human resource management application may provide one form for adding a new employee and another form for calculating the taxes of an existing employee.

A form generally contains elements such as labels/header/footer (containing pre-defined data), fields/text areas (enabling users to specify data), and buttons/links (enabling users to initiate actions that may be performed using the form). For example, an add employee form may contain fields enabling a user to specify the details of a new employee and a button for initiating the action of adding the specified new employee.

A user may need to initiate actions on different applications, typically because each of such applications is designed for a corresponding broad functionality. For example, a user may use human resource management application to add a new employee and may then use a procurement application to procure the required material/resources for the employee.

A common interface is often provided to facilitate users to interact with multiple applications. Providing such common interfaces may simplify the user interaction since the user may need to simply select/execute the program representing the common interface (to interact with the applications).

It is generally desirable to simplify interaction with multiple applications when using forms via a common interface.

BRIEF DESCRIPTION OF THE DRAWINGS

Example embodiments of the present invention will be described with reference to the accompanying drawings briefly described below.

Each of FIGS. 3A and 3B depict a portion of a screen displayed in response to a user specifying action and class identifiers identifying forms required to initiate desired actions in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention simplifies interactions (from a client system) with multiple applications (executing on a set of server systems) when using forms via a common interface to manipulate various classes of data. In one embodiment, a mapping data indicating forms used for corresponding combinations of actions and classes of data is maintained. On receiving an action identifier and a class identifier from a user using the common interface, the specific form is determined from the mapping data based on the action and class identifiers. The specific form is then displayed to the user on a display.

The specific form (determined based on the action and class identifiers) is retrieved from a corresponding application designed to provide the specific form before displaying the form to the user. The user may further provide an instance identifier identifying an instance of the class of data identified by the class identifier, whereby, the specific form is determined based on the action, class and instance identifiers.

According to another aspect of the present invention, a user is provided with an alternate sub-interface (in the common interface) enabling the user to access the forms provided by the multiple applications. The alternate sub-interface requires the user to navigate a subset of forms before the user is able to access the specific form (identified by the combination of action and class identifiers in the first aspect noted above).

In one embodiment, the multiple applications together constitute an enterprise application, with the classes of data corresponding to business objects defined in the enterprise application (with the class identifier corresponding to the name of a business object). The actions may then correspond to that of creation of a new business object, update of an existing business object, deletion of an existing business object, listing of business objects and search for a business object, wherein the action identifier may correspond to one of add, edit, delete, list and search.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
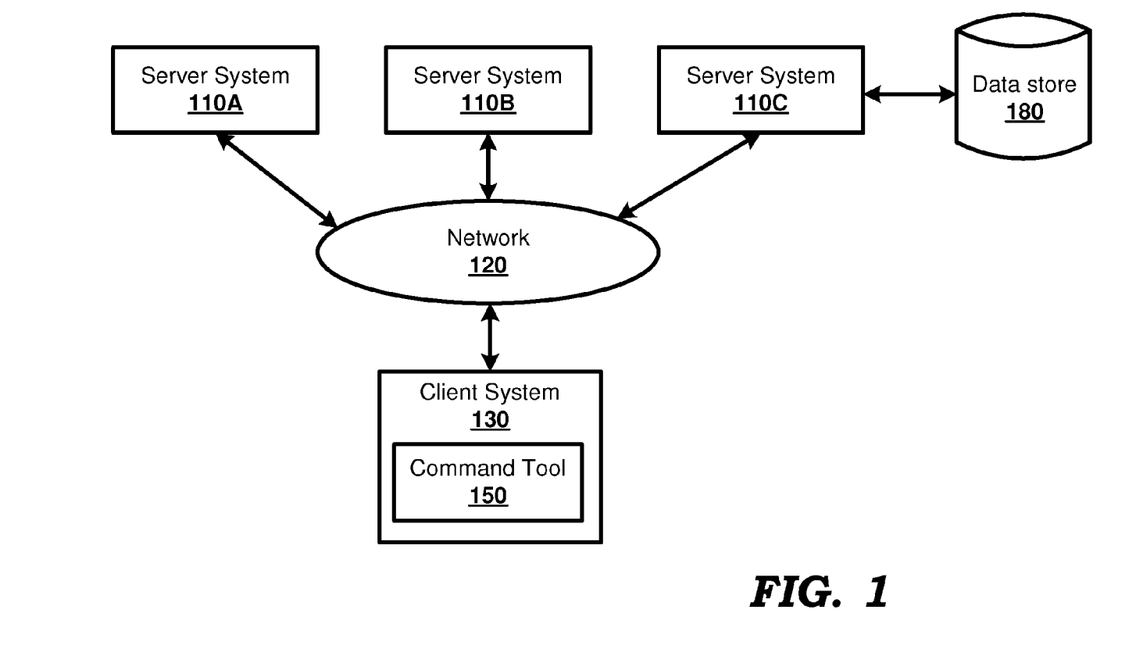
FIG. 1 is a block diagram illustrating an example environment in which various aspects of the present invention can be implemented.

FIG. 1 is a block diagram illustrating an example environment (example computing system) in which various aspects of the present invention can be implemented. The block diagram is shown containing server systems 110A-110C, network 120, client system 130 (containing command tool 150), and data store 180.

Merely for illustration, only representative number/type of systems are shown in the Figure. Many environments often contain many more systems, both in number and in type, depending on the purpose for which the environment is designed. Each system/device of FIG. 1 is described below in further detail.

Network 120 provides connectivity between various server systems 110A-110C and client system 130. Network 120 may be implemented using protocols such as Internet Protocol (IP) well known in the relevant arts.

Data store 180 contains a non-volatile storage, and facilitates storage and retrieval of a collection of data. The data may be viewed as containing multiple instances (e.g., rows in a table) of classes (e.g., tables) of data. In one embodiment, data store 180 is implemented using relational database technologies and therefore provides storage and retrieval of data using structured queries such as SQL.

Each of server systems 110A-110C represents a server system, such as a web/application server (e.g., Oracle Application Server available from Oracle Corporation, Apache server, IIS Server available from Microsoft Corporation) executing software applications capable of performing actions requested by client system 130. The software applications also receive requests for accessing forms from client system 130, and send the requested forms as corresponding responses.

It may be appreciated that the same application may be executed on one or more of the server systems (as instances of the application), typically for load balancing and fault-tolerance. Alternatively, multiple applications may be viewed as multiple tiers constituting a single enterprise application.

Client system 130 represents a system such as a personal computer, workstation, mobile station, etc. Client system 130 may be used by a user to generate requests (for performing actions) to one of server systems 110A-110C. It may be appreciated that client system 130 may contain other software such as operating system, device drivers, etc., (not shown) that provide a run-time environment in which command tool 150 is executed.

In general, a user (using client system 130) interacts with an application (for performance of desired actions) by first sending requests for accessing desired forms to an application executing on one of server systems 110A-110C. On receiving the forms, the user specifies the desired data and initiates the desired actions using the forms. As such, a user desiring to interact with multiple applications may be required to send requests for desired forms to the multiple applications.

Command tool 150 represents a software program (or a part thereof) executing in the run time environment of client system 130. On execution, command tool 150 provides a common interface enabling a user to interact (request forms, receive requested forms and initiate desired actions) with multiple applications. An aspect of the present invention enables command tool 150 to simplify interaction with multiple applications via a common interface as described below with examples.

3. Simplifying Interaction with Multiple Applications

Figure 2:
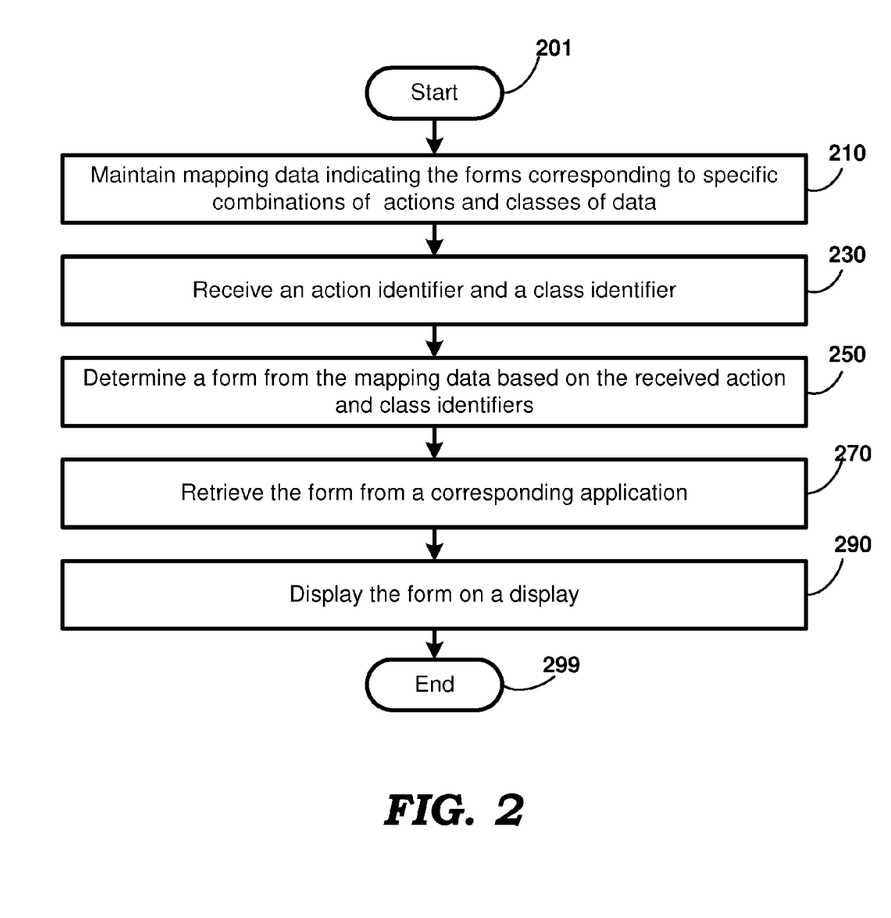
FIG. 2 is a flowchart illustrating the manner in which interaction with multiple applications when using forms via a common interface is simplified according to an aspect of the present invention.

FIG. 2 is a flowchart illustrating the manner in which interaction with multiple applications when using forms via a common interface is simplified according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations contemplated to be covered by several aspects of the present invention. The flow chart begins in step 201, in which control immediately passes to step 210.

In step 210, command tool 150 maintains mapping data indicating the forms corresponding to specific combinations of actions and classes of data. The set of actions correspond to the actions permitted by the use of different forms of interest, and can be determined by examining the definitions/design of the forms. A class of data represents a logical grouping of similar data instances, which can be manipulated (add, delete, edit, list, search, etc.) according to several aspects of the present invention.

In step 230, command tool 150 receives an action identifier and a class identifier. The identifiers may be received from a user using a common interface provided by command tool 150 or another application executing in the run-time environment of client system 130. The action and class identifiers may identify respectively one of the actions and one of the classes of data, which together identify a form as described below.

In step 250, command tool 150 determines a form from the mapping data based on the action and class identifiers. The determination may be performed by inspecting the mapping data to identify the form corresponding to the specific combination of the action (identified by the action identifier) and class of data (identified by the class identifier). The mapping data may also indicate the applications (executing on server systems 110A-110C) designed to provide the specific forms, and the form may be retrieved from the application, as described below.

In step 270, command tool 150 retrieves the form from a corresponding application. Command tool 150 may first inspect the mapping data to determine the specific application (among multiple applications) providing the form determined in step 250. Command tool 150 may then send a request for the form to the specific application and receive the form in response to the request.

In step 290, command tool 150 displays the form on a display (not shown in FIG. 1) linked to client system 130. A user may use the displayed form to specify data and to initiate the desired actions. The flow chart ends in step 299.

Thus, a user may perform desired actions by specifying corresponding action and class identifiers using the common interface provided by command tool 150. The forms identified by the specific combinations of action and class identifiers are retrieved from corresponding applications by command tool 150 and then displayed to the user.

Thus, a user may be provided quick/direct access to desired forms by simply specifying the identifiers noted above, thereby simplifying the interaction of the user with multiple applications. The manner in which command tool 150 enables a user to interact with multiple applications is illustrated below with examples.

4. Example Illustrating Interaction

Figure 3A:
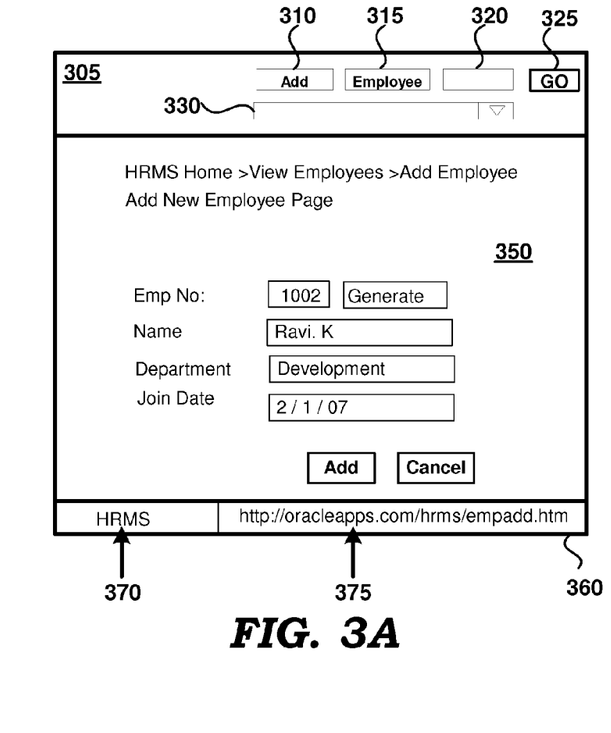
Figure 3B:
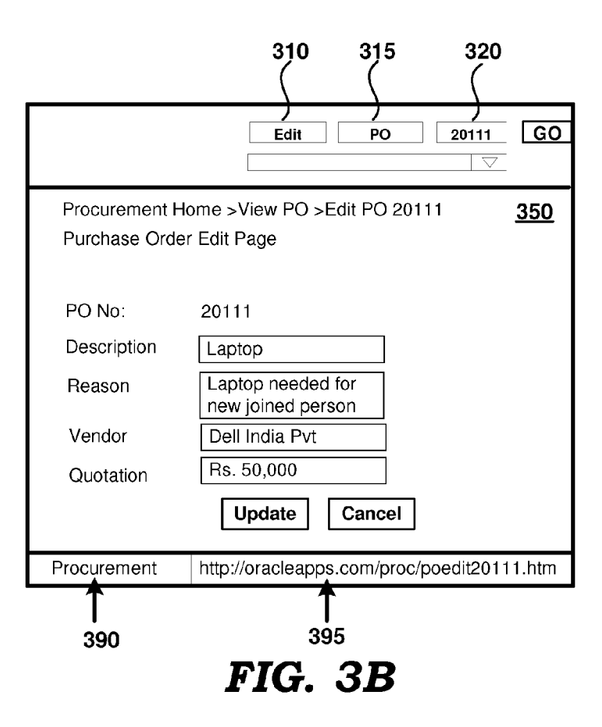

FIGS. 3A and 3B illustrate the manner in which interaction with multiple applications when using forms via a common interface is provided to a user in an embodiment. Each of the Figures is described in detail below.

The example illustrates the manner in which a user/manager may add a new employee to an enterprise. The enterprise is assumed to contain multiple web servers (such as server systems 110A-110C) executing multiple web applications, with each web application designed to provide a broad functionality such as human resource management, procurement, finance, payroll etc.

Thus, the manager may be required to first add the details of the new employee using a human resource management application and then edit an existing purchase order using a procurement application (to procure a laptop for the new employee). For performing the actions of adding and editing, the manager may need to request for forms from the corresponding web applications.

Each of the web application may enable a user/manager to perform desired actions using web pages (containing forms). Each of the forms may be associated with a universal resource locator (URL) indicating the location/identifier of a web server executing the web application providing the form, the location/identifier of the web application and the location/identifier of the form. As such, the user/manager may be required to specify the URLs corresponding to the desired forms.

It would be desirable that a user be provided a common interface, which enables the user to perform actions by specifying only the actions and the classes of data in the enterprise. The classes of data may correspond to business objects (such as Employee, Purchase Order, Account etc.) defined in the enterprise, while the actions may correspond to one of creating, editing, deleting, listing and searching of business objects.

An aspect of the present invention enables a user to access forms by specifying identifiers of actions and classes of data associated with the forms. The manner in which a user performs desired actions by specifying identifiers of actions and classes of data associated with forms required for performance of the desired actions is described below with examples.

5. Performing Desired Actions

FIG. 3A depicts a portion of a screen displayed in response to a user specifying action and class identifiers identifying a form required to initiate a desired action in an embodiment.

Display area 305 represents an interface, which enables a user to specify action and target identifiers. Display area 305 is shown containing text fields 310, 315, and 320, select field 330 and button 325.

Text field 310 enables a user to specify an action identifier ("Add"), while text field 315 enables a user to specify a class identifier ("Employee"). Text field 320 enables a user to specify an instance identifier (" " indicating that no value is specified). Select field 330 displays a list of combinations of the identifiers previously specified by the user, thereby enabling a user to select one of the previously specified actions.

On clicking button 325, command tool 150 determines a form from mapping data based on the identifiers (action, class and instance) specified by the user (either in respective text fields 310, 315 and 320 or in select field 330). The determined form may be retrieved from a corresponding application and then displayed to the user.

Display area 350 displays the form identified by the action identifier ("Add"), the class identifier ("Employee") and the instance identifier (" ") specified by a user in display area 305. It may be observed that display area 350 includes labels such as "HRMS Home>View Employees>Add Employee" specifying information about the form, fields for displaying/specifying desired data, and buttons (with labels "Add" and "Cancel") enabling a user to initiate actions associated with the form.

Display area 360 displays information about the form (and the corresponding application) displayed in display area 350. In particular, text 370 ("HRMS") indicates the name of the application providing the identified form and text 375 ("http://oracleapps.com/hrms/empadd.htm") indicates the location of the form (for example, the complete URL of the web page).

A user desiring to perform a desired action may specify the required data in the form displayed in display area 350 and initiate the performance of the desired action (for example, by clicking the button labeled "Update"). Command tool 150 may then send a request for performance of the desired action to the corresponding application (executing in one of server systems 110A-110C).

Though not shown, it may be appreciated that command tool 150 may also receive a response to the request for performance of the desired action from the corresponding application. The response may indicate a success or failure (and associated reasons of failure) of performance of the requested action. Command tool 150 may then display the response in display area 350 in an appropriate/pre-specified manner.

Thus, a user/manager is enabled to add the details of the new employee (such as name "Ravi. K" and department "Development") using a human resource management application (such as "HRMS"). The user/manager may then desire the performance of the next desired action, that is, the editing of a purchase order in order to procure a laptop for the new employee. The manner in which the user/manger performs next desired actions using forms via a common interface is described in detail below.

FIG. 3B depicts a portion of another screen displayed in response to a user specifying action and class identifiers identifying another form required to initiate a next desired action in an embodiment. FIG. 3B is similar to FIG. 3A and therefore the description of the various features is not repeated for conciseness.

The text "Edit" in text field 310 indicates the action identifier, the text "PO" in text field 315 indicates the class identifier and text "20111" indicates the instance identifier (identifying the specific instance of the class of data "PO") specified by the user. On clicking button 325, command tool 150 determines the next form from the mapping data based on the identifiers specified by the user and displays the next form in display area 350.

Display area 350 displays the form identified by the identifier specified by the user in display are 305, and display area 360 displays information about the displayed form. In particular, text 390 ("Procurement") indicates the name of the application providing the identified form and text 395 ("http://oracleapps.com/proc/poedit20111.htm") indicates the location (URL) of the form. The user may specify the desired data and perform the next desired action (for example, by clicking the button labeled "Update").

Thus, the user/manager may perform the sequence of desired actions by specifying combinations of action and class identifiers (and optionally instance identifier) indicating the forms to be retrieved from the multiple applications and then initiating the desired actions. As such, the interaction of the user with multiple applications when using forms via a common interface is simplified.

It may be appreciated that command tool 150 enables such simplification of interaction based on the mapping data. The mapping data indicates the forms (and providing applications) corresponding to combinations of action, class and instance identifiers. The description is continued describing the manner in which mapping data is maintained in an embodiment.

6. Maintaining Mapping Data

Figure 4A:
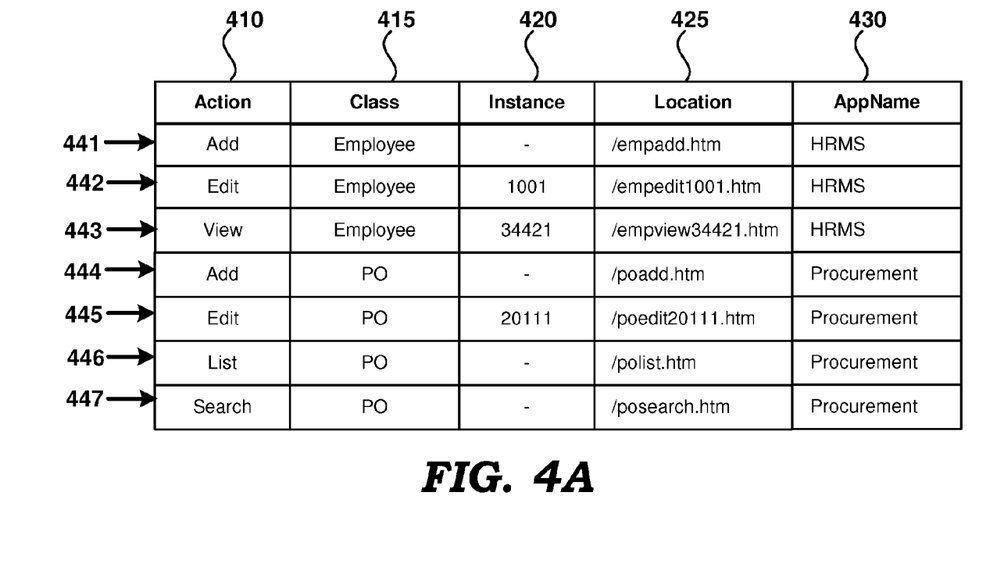
FIG. 4A depicts sample details of the actions and classes (and the instances) associated with forms stored in a table in a database in an embodiment.
Figure 4B:
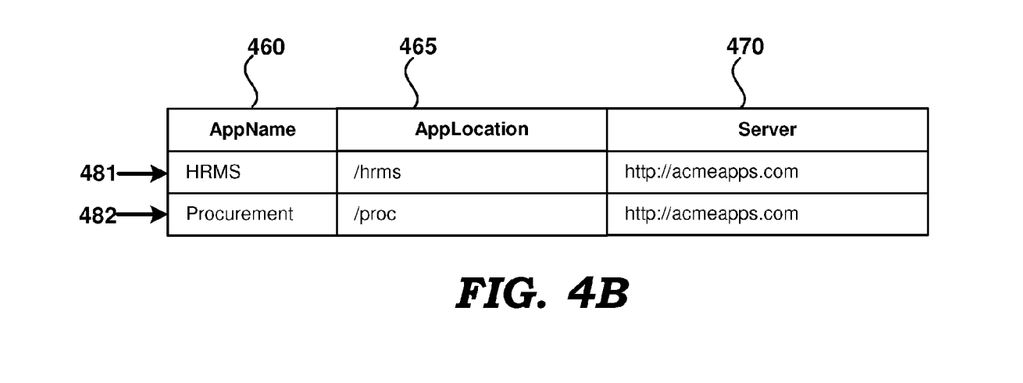
FIG. 4B depicts sample details of applications providing forms used for performance of actions stored in a table in a database in an embodiment.

FIGS. 4A and 4B illustrate the manner in which mapping data indicating the forms corresponding to combinations of action and class identifiers are maintained in an embodiment. Each of the Figures is described in detail below.

FIG. 4A depicts sample details of the actions and classes (and the instances) associated with forms (and corresponding applications) stored in a table in a database in an embodiment.

Column 410 (labeled "Action") specifies the action identifier identifying the action associated with each of the forms. Column 415 (labeled "Class") specifies the class identifier identifying the class of data associated with each of the forms. Column 420 (labeled "Instance") specifies the instance identifier identifying the instance of the class of data (identified by the class identifier) associated with each of the forms.

It may be appreciated that the combination of values in column 410 (i.e., the action identifier), column 415 (i.e., the class identifier) and column 420 (i.e., the instance identifier) uniquely identifies each of the forms. Further, column 420 may specify a value "-" indicating that that an instance identifier is not required for identifying the form.

Column 425 (labeled "Location") specifies the location of each of the forms. In one embodiment where the forms correspond to web pages, the location of the form may specify the identifier (a portion of the URL) of the web page corresponding to the form. Column 430 (labeled "AppName") specifies the name of the application providing each of the forms.

Each of rows 441-447 specifies the detail of the actions and targets associated with a form provided by a corresponding application. In particular, row 441 specifies a form identified by the action identifier "Add" (as shown in column 410) and the target identifier "Employee" (as shown in columns 415 and 420) having a corresponding web page "/empadd.htm" (as shown in column 425) provided by the application "HRMS" (as shown in column 430). Similarly other rows specify the details of other forms.

It may be observed that rows 441-443 specify the details of forms provided by the application "HRMS" while rows 444-447 specify the details of forms provided by the application "Procurement". Thus, the forms provided by multiple applications may be maintained. For retrieving the web pages from corresponding applications, it may be necessary that the details of the applications be also maintained as described in detail below.

FIG. 4B depicts sample details of applications providing forms used for performance of actions stored in a table in a database in an embodiment.

Column 460 (labeled "AppName") specifies the name of each of the applications. Column 465 (labeled "AppLocation") specifies the location of each of the application (in a corresponding server). Column 470 (labeled "Server") specifies the location of the server on which each of the application is currently executing.

Each of rows 481-482 specifies the details of an application providing forms used for performance of actions. In particular, row 481 specifies an application with name "HRMS" (as shown in column 460) located at "/hrms" (as shown in column 465) executing on the server system "http://acmeapps.com" (as shown in column 470).

It may be observed that the application specified in row 481 provides the forms specified in rows 441-443, since the name "HRMS" of the application in column 460 (of row 481) is the same as the name of the application specified in column 430 (of each of the rows 441-443).

Command tool 150 to retrieve a form specified by row 441, first identifies the details of the application corresponding to the form as indicated by row 481. Command tool 150 then concatenates the location of the server "http://acmeapps.com", the location of the application in the server "/hrms" and the location of the form "/empadd.htm" to generate the physical location of the form as a complete URL "http://acmeapps.com/hrms/empadd.htm" from where the form may be retrieved.

It may be observed that the physical location of the form is displayed as texts 375 and 395 (along with the name of the application in texts 370 and 390) in FIGS. 3A and 3B respectively.

From the above it may be appreciated that a knowledgeable user can quickly access a desired form by merely entering the identifiers (along with any needed instance identifiers). However, less knowledgeable user may require a simpler user interface, which is provided as an alternative (sub-) interface in the common interface, as described below with examples.

7. Providing an Alternative Interface

FIGS. 5A-5G together illustrate the manner in which an alternative interface for interaction with multiple applications when using forms is provided in an embodiment. It is assumed that the various forms are provided by multiple applications belonging to an enterprise (named "Acme Enterprise") as described above.

Figure 5A:
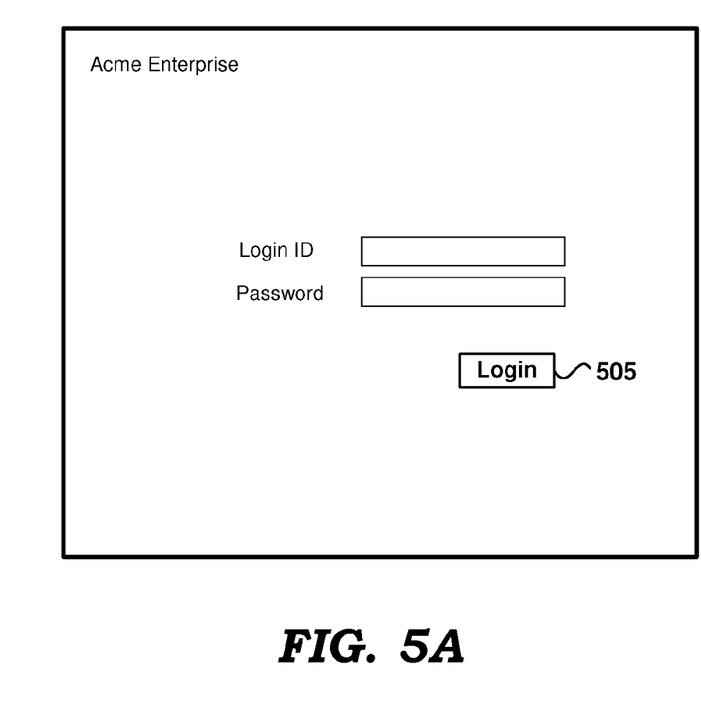
FIGS. 5A-5G together illustrate the manner in which an alternative interface for interaction with multiple applications when using forms is provided in an embodiment.

In FIG. 5A, a login form is displayed to a user. The user may specify the login ID and the password in the text fields provided in the form and then may click on button 505 (labeled "Login") to initiate the action of validation. In the scenario that the validation of the user is successful, the form depicted in FIG. 5B is displayed to the user.

Figure 5B:
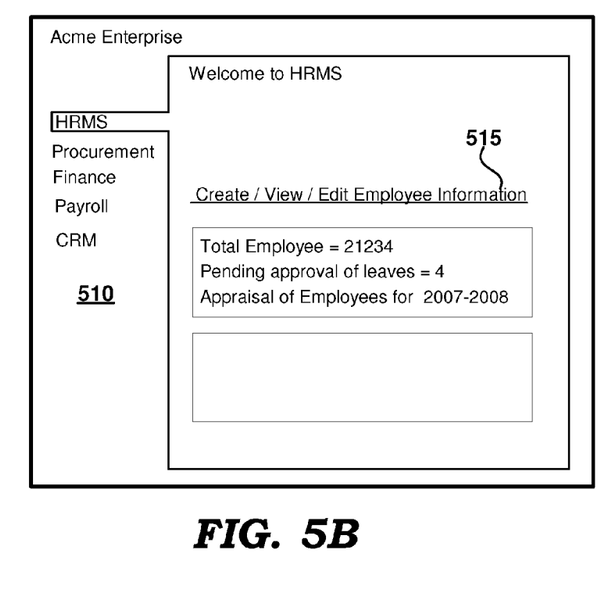

In FIG. 5B, display area 510 displays a list of applications available in the enterprise system such as "HRMS", "Procurement" etc. in the form of tabs. A user may select one of the applications by selecting the corresponding tab. As such, display area 510 depicts that the current application selected by the user is the "HRMS" application (as indicated by the corresponding selected tab shown with surrounding lines).

On selecting the "HRMS" application, a welcome form may be displayed to the user. The user may then select the action to be performed, for example, click link 515 (labeled "Create/View/Edit Employee Information") and a corresponding form (as depicted in FIG. 5C) may be displayed to the user.

Figure 5C:
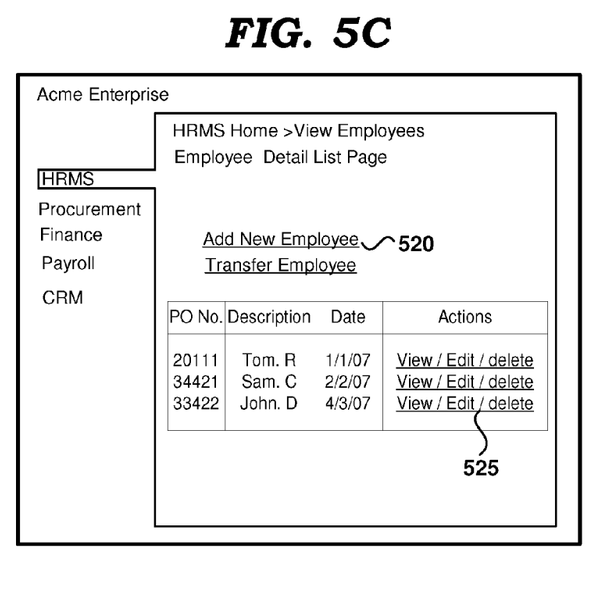

In FIG. 5C, more actions represented by link 520 (labeled "Add New Employee") and link 525 (labeled "View/Edit/Delete" associated with a corresponding entry in the displayed table) are displayed. On selection of link 520 by the user, the form depicted in FIG. 5D may be displayed.

Figure 5D:
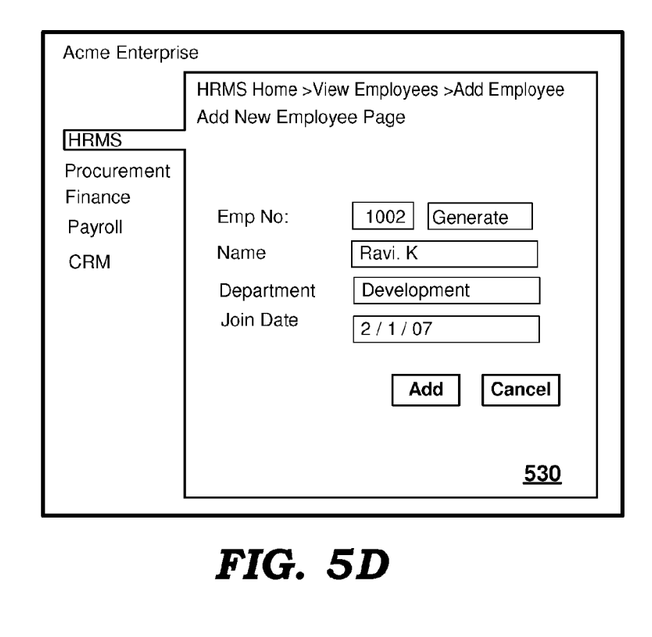

In FIG. 5D, display area 530 depicts the form displayed to the user in response to the selection of link 520. It may be observed that the form depicted in display area 530 is similar to the form displayed in display area 350 in FIG. 3A. The user may then specify the desired data and initiate performance of the desired action (for example, by clicking on the button labeled "Add").

Figure 5E:
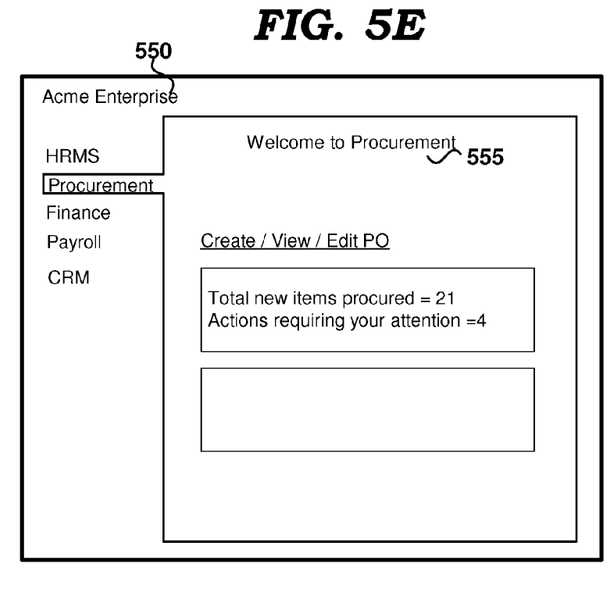
Figure 5F:
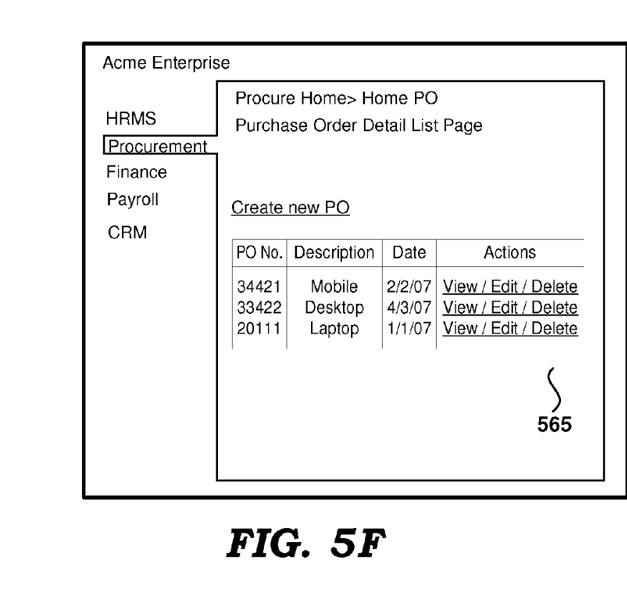

To perform the next desired action, a user may then selects a second application "Procurement" (by selecting tab 550) to display a second welcome form (as depicted in FIG. 5E). The user may then click link 555 (labeled "Create/View/Edit PO") to display the form depicted in FIG. 5F and then click link 565 (labeled "View/Edit/Delete") to display the form depicted in FIG. 5G.

Figure 5G:
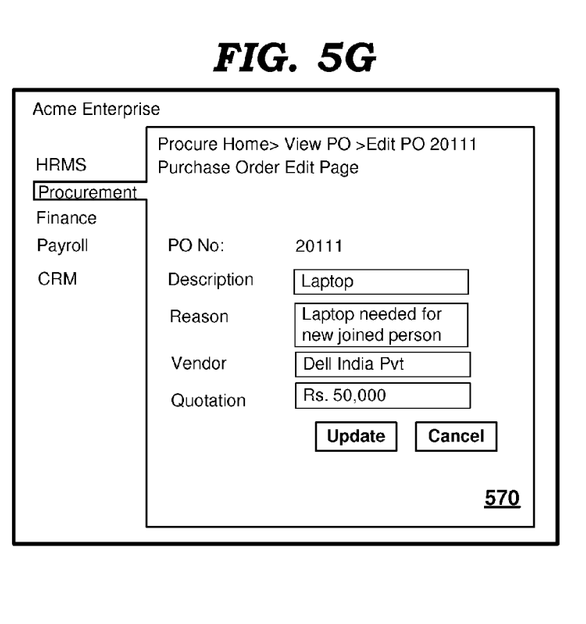

In FIG. 5G, display area 570 depicts the form displayed to the user in response to the selection of link 565. It may be observed that the form depicted in display area 570 is similar to the form displayed in display area 350 in FIG. 3B. The user may then specify the desired data and initiate performance of a desired action (for example, by clicking on the button labeled "Update").

Though the alternate interface enables a user to perform actions using multiple applications, it may be appreciated that a user may be required to navigate through a set of forms in order to access a form required for performance of the desired action. The set of forms to be navigated may depend on the manner in which the application is designed to provide the desired action.

It should further be appreciated that command tool 150 may be implemented in a combination of one or more of hardware, software and firmware. The description is continued with respect to an embodiment in which various features are operative by execution of corresponding software instructions.

8. Digital Processing System

Figure 6:
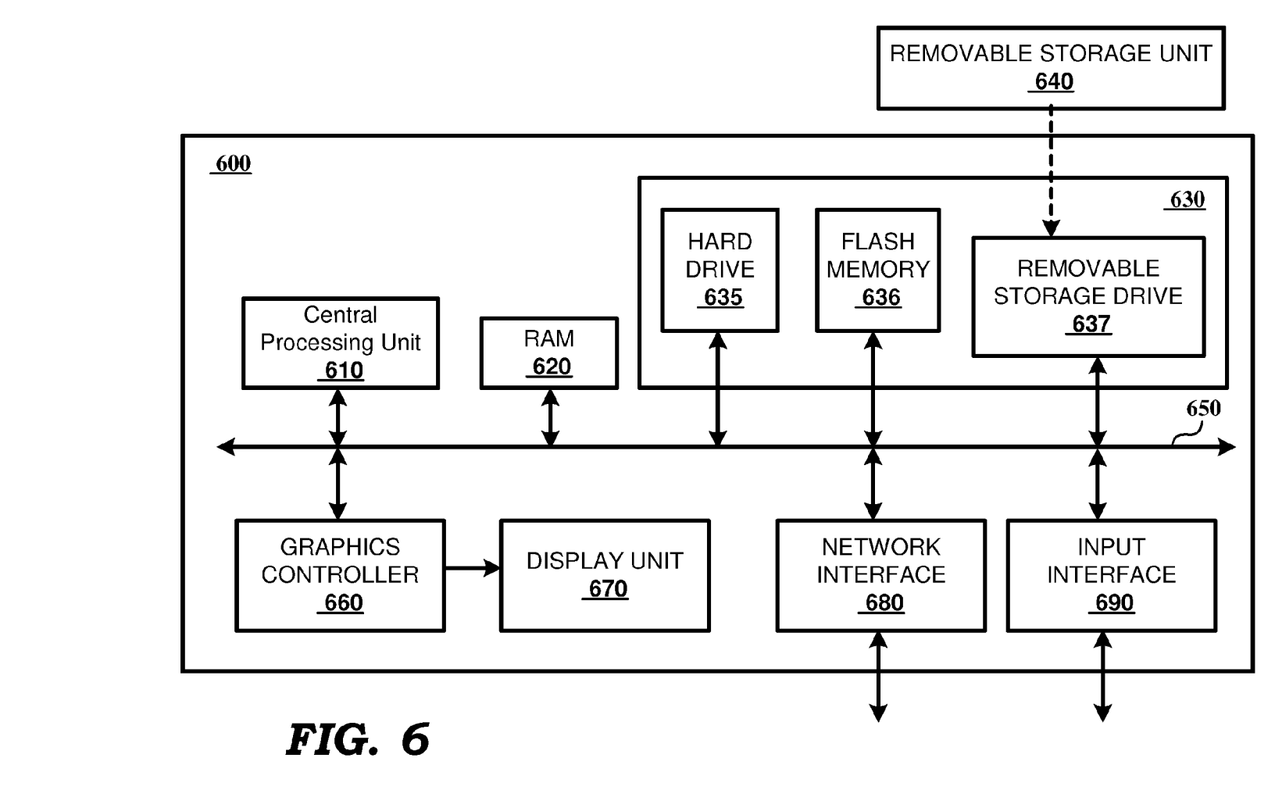
FIG. 6 is a block diagram illustrating the details of a digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to client system 130 (executing command tool 150).

Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals (such as the user interfaces depicted in FIGS. 3A-3B and 5A-5G). Input interface 690 may correspond to a keyboard and a pointing device (e.g., touch-pad, mouse). Network interface 680 provides connectivity to a network (e.g., using Internet Protocol), and to communicate with other connected systems (such as server systems 110A-110C) of FIG. 1.

Secondary memory 630 may contain hard drive 635, flash memory 636, and removable storage drive 637. Secondary memory 630 may store the data (e.g., portions of data depicted in FIGS. 4A and 4B) and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of enabling a user to interact with a plurality of applications via a common interface, said method being implemented on a client system, wherein each of said plurality of applications is executed on a corresponding set of server systems and is designed to provide a corresponding plurality of forms for manipulating a plurality of classes of data, wherein each form corresponds to a combination of one of a plurality of actions and one of said plurality of classes of data, said method comprising:

maintaining a mapping data indicating a specific one of said plurality of forms used for a combination of an action and a class of data;

providing an area in said common interface for said user to enter a first text and a second text respectively specifying an action identifier and a class identifier;

receiving said action identifier and said class identifier entered by said user in said area;

determining a first form from said mapping data based on said action identifier and said class identifier in response to said receiving, said first form being contained in said plurality of forms; and displaying said first form on a display as a response to said receiving of said action identifier and said class identifier, wherein said maintaining, said receiving, said determining and said displaying are performed in said client system, and wherein said user is provided the ability to initiate an action corresponding to said action identifier in at least one of said plurality of applications with respect to class data corresponding to said class identifier using an element contained in the displayed first form.

2. The method of claim 1, wherein said maintaining maintains in said mapping data a corresponding application which provides the corresponding form, wherein said determining determines a first application providing said first form, said first application being contained in said plurality of applications, said method further comprising:

retrieving said first form from said first application, wherein said displaying displays the retrieved form as said first form.

3. The method of claim 2, wherein said providing provides for said user to enter a third text in said area, wherein said third text specifies an instance identifier identifying an instance of the class of data identified by said class identifier, wherein said receiving further receives said instance identifier entered in the form of said third text by said user in said area, wherein said determining determines said first form from said mapping data based on said action identifier, said class identifier and said instance identifier in response to said receiving, wherein said displayed first form contains data from said instance identified by said instance identifier.

4. The method of claim 3, wherein said area comprises a first text field, a second text field and a third text field for respectively entering said first text, said second text and said third text.

5. The method of claim 1, wherein said maintaining, said receiving, said determining and said displaying are provided by a sub-interface contained in said common interface, said method further comprising:

providing an alternative sub-interface to enable said user to access said first form from said client system.

6. The method of claim 5, wherein said alternative sub-interface comprises requiring said user to navigate a subset of forms contained in said plurality of forms before said user is able to access said first form.

7. The method of claim 6, wherein said plurality of applications constitute an enterprise application.

8. The method of claim 7, wherein said plurality of classes of data corresponds to a plurality of business objects defined in said enterprise application, wherein said class identifier corresponds to a name associated with the corresponding business object.

9. The method of claim 8, wherein each of said plurality of actions corresponds to one of creation of a new business object, update of an existing business object, deletion of an existing business object, listing of business objects and search for a business object, wherein said action identifier corresponds to one of add, edit, delete, list and search.

10. A non-transitory machine readable medium storing one or more sequences of instructions for causing a client system to enable a user to interact with a plurality of applications via a common interface, wherein each of said plurality of applications is executed on a corresponding set of server systems and is designed to provide a corresponding plurality of forms for manipulating a plurality of classes of data, wherein each form corresponds to a combination of one of a plurality of actions and one of said plurality of classes of data, wherein execution of said one or more sequences of instructions by one or more processors contained in said client system causes said client system to perform the actions of:

maintaining a mapping data indicating a specific one of said plurality of forms used for a combination of an action and a class of data;

receiving an action identifier and a class identifier from said user;

determining a first form from said mapping data based on said action identifier and said class identifier in response to said receiving, said first form being contained in said plurality of forms;

displaying said first form on a display, and wherein said user is provided the ability to initiate an action corresponding to said action identifier in at least one of said plurality of applications with respect to class data corresponding to said class identifier using an element contained in the displayed first form, wherein said maintaining, said receiving, said determining and said displaying are provided by a sub-interface contained in said common interface; and providing an alternative sub-interface to enable said user to access said first form from said client system, wherein said alternative sub-interface comprises requiring said user to navigate a subset of forms contained in said plurality of forms before said user is able to access said first form.

11. The non-transitory machine readable medium of claim 10, wherein said maintaining maintains in said mapping data a corresponding application which provides the corresponding form, wherein said determining determines a first application providing said first form, said first application being contained in said plurality of applications, further comprising one or more instructions for:

retrieving said first form from said first application, wherein said displaying displays the retrieved form as said first form.

12. The non-transitory machine readable medium of claim 11, wherein said receiving further receives an instance identifier identifying an instance of the class of data identified by said class identifier, wherein said determining determines said first form from said mapping data based on said action identifier, said class identifier and said instance identifier in response to said receiving.

13. The non-transitory machine readable medium of claim 12, wherein said plurality of applications constitute an enterprise application, wherein said plurality of classes of data corresponds to a plurality of business objects defined in said enterprise application and each of said plurality of actions corresponds to one of creation of a new business object, update of an existing business object, deletion of an existing business object, listing of business objects and search for a business object, wherein said class identifier corresponds to a name associated with the corresponding business object and said action identifier corresponds to one of add, edit, delete, list and search.

14. A computing system comprising:

a set of server systems executing a plurality of applications, wherein each of said plurality of applications is designed to provide a corresponding plurality of forms to facilitate users to manipulate a plurality of classes of data, wherein each form corresponds to a combination of one of a plurality of actions and one of said plurality of classes of data; and a client system comprising:

a display unit;

a memory storing a mapping data indicating a specific one of said plurality of forms used for a combination of an action and a class of data, wherein said mapping data indicates a first form is available from a first application executing on a first server system, wherein said mapping data indicates a second form is available from a second application executing on a second server system, wherein said first form and said second form are contained in said plurality of forms, wherein said first application and said second application are contained in said plurality of applications, wherein said first server system and said second server system are contained in said set of server systems; and a processor operable to:

receiving a first action identifier and a first class identifier in a first request, and then a second action identifier and a second class identifier in a second request, both of said first request and said second request being received from a common interface provided to a user on said display unit of said client system;

determining in response to receiving of said first request, said first form from said mapping data based on said first action identifier and said first class identifier, wherein said determining determines, in response to receiving of said second request, said second form from said mapping data based on said second action identifier and said second class identifier;

retrieving said first form from said first application and said second form from said second application; and displaying said first form on said display unit as a first response to said first request, wherein said displaying further displays said second form on said display unit as a second response to said second request, and wherein said user is provided the ability to initiate respective actions in different application executing on corresponding server systems using said common interface provided on said display unit of said client system.

15. The computing system of claim 14, wherein said processor further receives in said first request, an instance identifier identifying an instance of the class of data identified by said first class identifier, wherein said processor determines said first form from said mapping data based on said first action identifier, said first class identifier and said instance identifier.

16. The computing system of claim 14, wherein said processor provides an alternative interface to enable a user to access said first form.

17. The computing system of claim 16, wherein said alternative interface comprises requiring said user to navigate a first subset of forms contained in said plurality of forms before said user is able to access said first form, wherein said user is required to navigate a second subset of forms contained in said plurality of forms before said user is able to access said second form, wherein said first subset of forms is available from said first application and said second subset of forms is available from said second application, wherein said common interface enables said user to directly access said first form and said second form without having to navigate said first subset of forms and said second subset of forms.

18. The computing system of claim 17, wherein said plurality of applications constitute an enterprise application, wherein said plurality of classes of data corresponds to a plurality of business objects defined in said enterprise application and each of said plurality of actions corresponds to one of creation of a new business object, update of an existing business object, deletion of an existing business object, listing of business objects and search for a business object, wherein said first class identifier corresponds to a name associated with the corresponding business object and said first action identifier corresponds to one of add, edit, delete, list and search.

19. The computing system of claim 14, wherein said mapping data indicates a first URL of said first form and a second URL of said second form, wherein said first URL includes a first address of said first server system and said second URL includes a second address of said second server system, wherein said retrieving of said first form and said second form is respectively based on said first URL and said second URL.

* * * * *

UNITED STATES PATENT AND TRADEMARK OFFICE
CERTIFICATE OF CORRECTION

PATENT NO. : 8,479,222 B2  Page 1 of 1
APPLICATION NO. : 11/849310
DATED : July 2, 2013
INVENTOR(S) : Chavan It is certified that error appears in the above-identified patent and that said Letters Patent is hereby corrected as shown below:

Title page, on Col. 1, after "US2009/0025017 A1  Jan. 22, 2009", insert

--Foreign Priority Data
  INDIA 1565/CHE/2007  07/19/2007--.

Signed and Sealed this
First Day of September, 2015

Michelle K. Lee
*Director of the United States Patent and Trademark Office*